United States Patent
Burton et al.

(10) Patent No.: US 7,490,030 B2
(45) Date of Patent: Feb. 10, 2009

(54) POWER MODELLING OF A CIRCUIT

(75) Inventors: John Mark Burton, Cambridge (GB); Syed Samin Ishtiaq, Cambridge (GB)

(73) Assignee: ARM Limited, Cambridge (GB)

(*) Notice: Subject to any disclaimer, the term of this patent is extended or adjusted under 35 U.S.C. 154(b) by 1038 days.

(21) Appl. No.: 10/286,914

(22) Filed: Nov. 4, 2002

(65) Prior Publication Data

US 2004/0088151 A1    May 6, 2004

(51) Int. Cl.
*G06F 17/50* (2006.01)

(52) U.S. Cl. .......................................... 703/18; 703/14

(58) Field of Classification Search .................. 703/18, 703/14
See application file for complete search history.

(56) References Cited

U.S. PATENT DOCUMENTS 6,910,025 B2* 6/2005 Cao ............................ 706/15

OTHER PUBLICATIONS

Zafalon, Rossello, Macii E., Poncino, "Power Macromodeling For A High Quality RT-Level Power Estimation", Mar. 20-22, 2000, IEEE 2000 First International Symposium on Quality Electronic Design, ISQED 2000 Proceedings. pp. 59-63.*
Guardiani, Zafalon, Rossello, Macii E., Poncino, Macii A, Scarsi, Silvano, "RTL Power Estimation In An Industrial Design Flow", Mar. 4-5, 1999, 1999 IEEE Alessandro Volta Memorial Workshop on Low-Power Design Proceedings, pp. 91-96.*
Benini et al. , "A power modeling and estimation framework for VLIW-based embedded systems," Sep. 26-28, 2001, Proc. Int. Workshop Power and Timing Modeling, Optimization and Simulation (PATMOS'01), pp. 52-60.*

* cited by examiner

*Primary Examiner*—Paul L Rodriguez
*Assistant Examiner*—Juan C Ochoa
(74) *Attorney, Agent, or Firm*—Nixon & Vanderhye P.C.

(57) ABSTRACT

Stimulation signals (22) are applied to a first circuit model (20) and the power behaviour of the circuit being modelled is determined from the behaviour of the first circuit model (20). In parallel, the same stimulation signals (22) are applied to a second circuit model (26) and the state variable changes within that second circuit model are calculated. The calculated power behaviour and the calculated state variable changes are then applied as training data inputs to a self learning power model, such as a neural network (28), which learns the relationship between state variable changes between the second model (26) and power behaviour of the circuit being simulated. In this way, a detailed first circuit model (20) may be used to calculate power behaviour and to train a separate power model (28, 30) which once trained can be publicly released without having to release sensitive information within the first circuit model (20).

24 Claims, 4 Drawing Sheets

POWER MODELLING OF A CIRCUIT

BACKGROUND OF THE INVENTION

1. Field of the Invention

This invention relates to the field of circuit design. More particularly, this invention relates to the modelling of the power behaviour of a circuit.

2. Description of the Prior Art

The power consumption of electronic circuits is becoming an increasingly important performance parameter associated with the design of electronic circuits. As an example, in mobile devices the power consumption of the circuits will control the maximum operational time which may be obtained from a battery charge. Long operational time from a single battery charge is highly desirable. A further example of power consumption being an important characteristic relates to the cooling requirements of a circuit. A circuit which runs hot will tend to be less reliable and have a shorter life than one which runs cooler. While cooling mechanisms may be added to a device to compensate for hot running circuits, these have their own associated disadvantages such as weight and expense.

It is known to provide models of circuits before the actual physical circuits are available for testing. Such models may be used to validate the design and/or assist with the development of other parts of a system, such as other circuit elements which interact with the modelled circuit or software which executes upon the modelled circuit. In the context of such models, it is highly desirable that it is possible to model the power consumption of a circuit before the circuit is actually produced. This makes it easier to modify a circuit design in order to reduce the power consumption of that design. It also makes it possible to test software which will run on a circuit to determine if that software has characteristics which will produce an undesirably high power consumption, e.g. behaviour which results in inefficient use of the cache memories and the like.

FIG. 1 of the accompanying drawings illustrates a known methodology for modelling the power behaviour of a circuit. A circuit design may be specified by a collection of register transfer language data 2. Such register transfer language data representations of circuits are well known in the art and will not be described further. Known power modelling tools, such as those provided by Synopsis and Sequence, analyse the register transfer language data 2 and extract from it a large number of simplified power circuit elements having defined inputs and outputs and for which the power modelling tool determines the amount of energy which will be consumed when transitioning those circuit elements from one state to another. Such a collection of data defining the circuit elements in this way is assembled as a power library 4.

The register transfer language data 2 is also separately compiled into a register transfer language based model 6 which may be subject to stimulus signals 8 to simulate operation of the circuit. The stimulus signals 8 may, for example, be a sequence of program instructions to be executed upon a register transfer language model 6 representing a microprocessor. The tools for simulating the action of a register transfer language model 6 are also well known and will not be described herein further. The output of the simulation is a collection of state change data 10 which specifies changes in signal values within the circuit which occur at identified times.

With the power library 4 and the state change data 10, a power analysis tool 12 may then use these as inputs to generate power behaviour data 14. More particularly, the state change data 10 may be examined to determine signal value changes which occur and these then applied to the relevant circuit elements within the power library 4 with the amount of energy consumed to make such state changes being looked up for the power element concerned and accumulate across the various elements which make up the whole circuit and with time as the state change data progresses through the simulation.

Whilst the technique illustrated in FIG. 1 can produce accurate results, it suffers from the significant disadvantage that a required input to this methodology is detailed register transfer language data 2 which describes the circuit design at such a level that the power analysis tools can properly break the circuit down into individual elements with known power characteristics. From a commercial point of view, it is often the case that a circuit designer does not wish to release the register transfer language data 2 to other parties, and accordingly other parties cannot make use of the type of methodology illustrated in FIG. 1.

FIG. 2 of the accompanying drawings illustrates one known technique by which a circuit designer can release information to allow others to simulate the operation of a circuit. In particular, the circuit designer will translate the register transfer language data 2 into simulation platform data 16 which is an abstraction of the register transfer language data 2. This abstracted representation will behave the same as regards external stimuli, but will typically have a simplified internal structure whereby the simulation platform data cannot readily be reverse engineered to reveal commercially sensitive information regarding the register transfer language data 2.

The simulation platform data 16 may be compiled into a simulation model 18 which can then be subject to stimulus signals 8 and exhibit changes of its state (logged within state behavior file 17) corresponding to changes which would occur if the stimulus signals 8 had been applied to a model derived from the register transfer language data 2 or indeed the physical circuit being modelled itself. It will be appreciated that once the simulation platform data 16 has been compiled into the simulation model 18, that simulation model 18 may be used without reference to the simulation platform data 16 and accordingly a circuit designer may only need to release to circuit users the simulation model 18. Existing power modelling tools cannot operate upon the abstracted simulation model 18.

It is desired to provide the ability to model the power behaviour of a circuit but without having to reveal potentially commercially sensitive details concerning the circuit design.

SUMMARY OF THE INVENTION

Viewed from one aspect the present invention provides a method generating a power model of a circuit, said method comprising the steps of:

simulating said circuit responding to a set of stimulus signals using a first circuit model;

determining respective power behaviour responses of said first circuit model to said set of stimulus signals;

simulating said circuit responding to said set of stimulus signals using a second circuit model;

determining respective state variable changes of said second circuit model resulting from said set of stimulus signals, said state variables of said second circuit model being a function of state variables of said first circuit model; and associating a determined power behaviour response to a stimulus signal with a corresponding determined state variable change resulting from said stimulus signal to form a power model for said second circuit model whereby state variable changes of said second circuit model may be mapped to corresponding power behaviour responses.

The invention recognises that a power model may be produced that is associated with the behaviour of a circuit simulation which is different from the circuit simulation that was analysed to identify the power behaviour. More particularly, if a first circuit model is stimulated and its power behaviour observed, then a second circuit model may be subject to the same stimulus and its state variable changes observed with the power behaviour from the first circuit model then being associated with the corresponding state variable changes within the second circuit model. Surprisingly, power behaviour is sufficiently consistent with state variable changes that a sufficiently accurate power model for the second circuit model can be built based upon state variable changes alone without having to directly reference circuit element design details when using that power model. Thus, for example, in the context of FIG. 2 a power model may be produced which is associated with the simulation model 18 and can respond to state variable changes within the simulation model 18 to indicate the power behaviour of the circuit being simulated.

It will be appreciated that if a circuit design was particularly simple, then the association of power behaviour to state variable changes could be manually made by a user. However, real life commercial systems tend to be far too complex for such a manual analysis and so it is strongly preferred that the power model is a self-learning model.

Self-learning models could take a variety of forms, such as a tabular mapping type of arrangement between state variable values and power behaviours. However, particularly preferred embodiments of the invention utilise a power model in the form of a neural network with the step of associating including applying power behaviour responses and corresponding state variable changes as training data to the neural network. Such a neural network has the capacity and flexibility to be able to automatically learn the relationship between state variable changes and power behaviour for a highly complex system. Furthermore, as the different number of possibilities for state variable changes can be so high that it is not possible to exhaustively simulate even a small number of these, the ability of a neural network to interpolate power behaviour for state variable changes that have not explicitly been tried during the building of the model is highly advantageous.

It will be appreciated that while the first circuit model and the second circuit model are different, the reasons that they differ could take a variety of forms. It may be desirable that the second circuit model is sufficiently fast (and consequently lacking in internal detail) that software simulation and development can be realistically performed even though there is no concern about the release of sensitive circuit design detail. However, a particularly useful situation in which the present technique may be used is one in which the first circuit model is a non-obscured circuit model and the second circuit model is an obscured circuit model.

It will be appreciated that the first circuit model could take a variety of forms with these generally being of a type from which power behaviour may be determined in response to given stimulus signals. However, particularly preferred embodiments of the first circuit model are when there is a model which may be synthesised to form a circuit layout or indeed is a circuit layout. Such models may be in the form of register transfer language models or gate level models.

It will also be appreciated that the second circuit model could take a variety of forms. Preferred forms of the second circuit model are ones in which it is one of a cycle-based model, a software development model, faster than the first circuit mode, missing portions of the circuit which are modelled in the first circuit model and an abstracted model of the first circuit model. A particular second circuit model may exhibit more than one of the above characteristics.

Viewed from another aspect the invention provides a power model of a circuit responsive during simulation to one or more stimulus signals to a circuit model of said circuit and one or more state variables held within said circuit model to determine a power behaviour response of said circuit.

It will be appreciated that when viewed from one aspect the invention provides a method of generating a power model. From another aspect the invention provides the power model itself which may be distributed and dealt with as a separate commercial entity in its own right.

Such power models may be embodied in a variety of different forms, but will typically be in the form of a computer program for controlling a general purpose computer in a way to generate the desired power behaviour data when operated in conjunction with a model of the circuit concerned.

Viewed from a further aspect the present invention provides apparatus for generating a power model of a circuit, said apparatus comprising:

first simulation logic operable to simulate said circuit responding to a set of stimulus signals using a first circuit model;

first determining logic operable to determine respective power behaviour responses of said first circuit model to said set of stimulus signals;

second simulating logic operable to simulate said circuit responding to said set of stimulus signals using a second circuit model;

second determining logic operable to determine respective state variable changes of said second circuit model resulting from said set of stimulus signals, said state variables of said second circuit model being a function of state variables of said first circuit model; and associating logic operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

Viewed from a still further aspect the invention provides a computer program product operable to control a computer to generate a power model of a circuit, said computer program product comprising:

first simulation code operable to simulate said circuit responding to a set of stimulus signals using a first circuit model;

first determining code operable to determine respective power behaviour responses of said first circuit model to said set of stimulus signals;

second simulating code operable to simulate said circuit responding to said set of stimulus signals using a second circuit model;

second determining code operable to determine respective state variable changes of said second circuit model resulting from said set of stimulus signals, said state variables of said second circuit model being a function of state variables of said first circuit model; and associating code operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
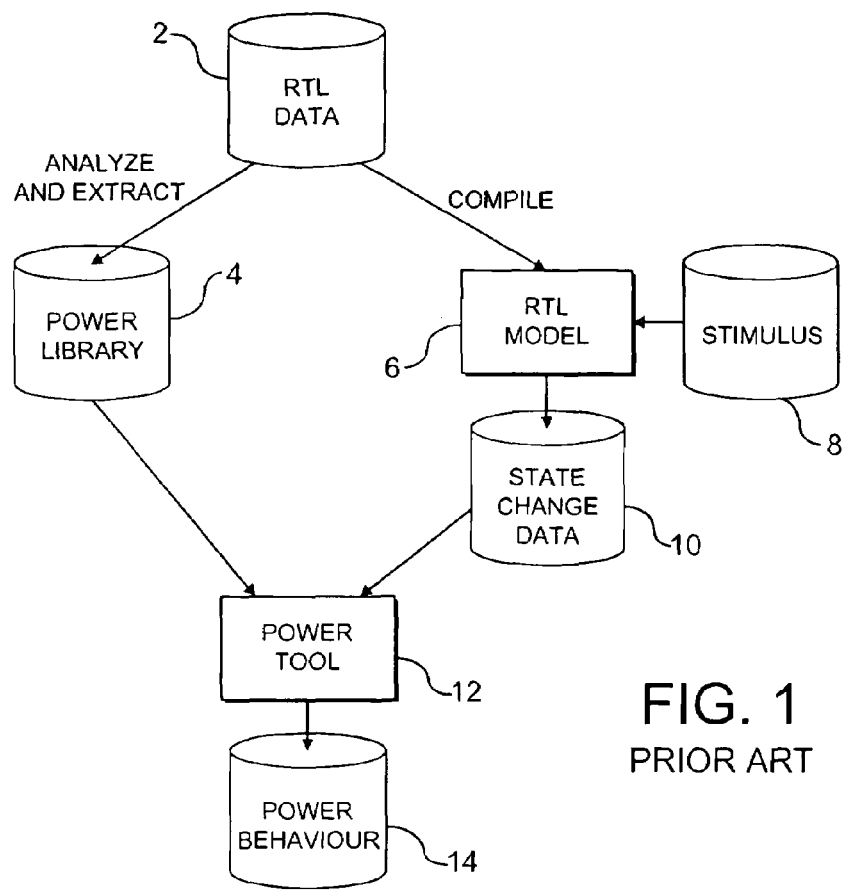
FIG. 1 schematically illustrates a known technique for power modelling.
Figure 2:
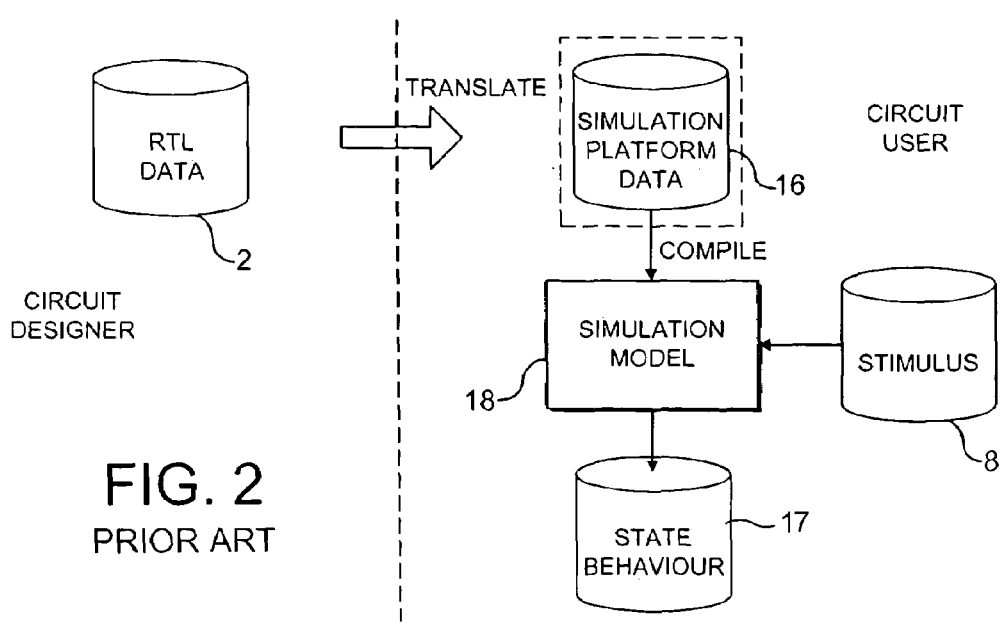
FIG. 2 schematically illustrates a known technique for obscuring circuit design information whilst providing a circuit simulation model.
Figure 3:
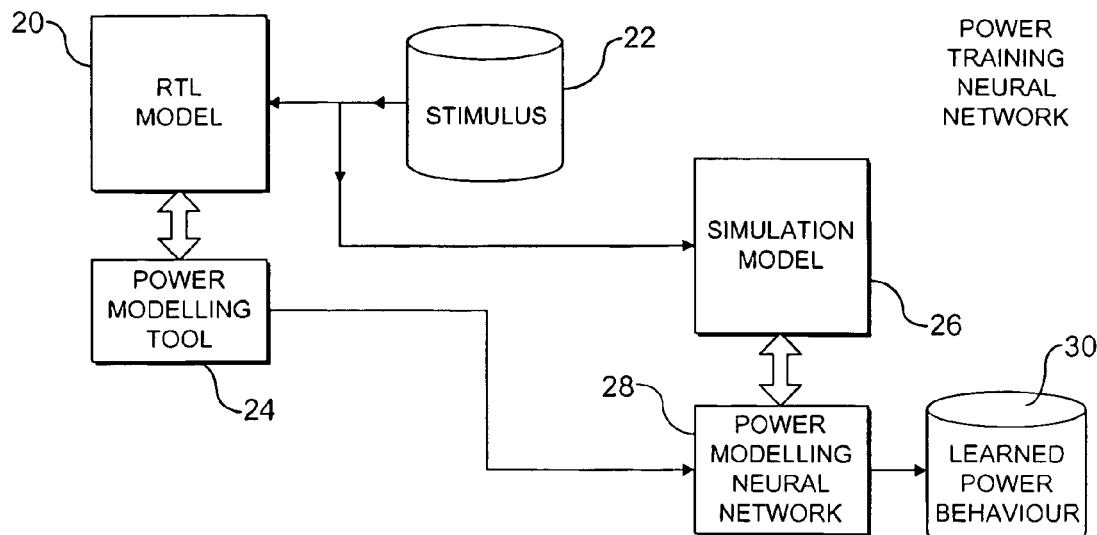
FIG. 3 schematically illustrates the generation of a power model to be associated with a simulation model distinct from a more detailed circuit design model from which the power data was generated.

FIG. 3 illustrates a system for generating a power model. More particularly, a register transfer language model 20 is subject to stimulus signal data 22. The register transfer language model 20 and the stimulation of this with stimulus signal data 22 are in themselves known techniques. A power modelling tool 24 associated with the register transfer language model 20 operates upon broadly similar principles to those described in relation to FIG. 1. However, compared to FIG. 1, the power modelling tool 24 operates on a cycle-by-cycle basis to identify the power behaviour response to a given stimulus signal from the stimulus signal data 22 being applied to the register transfer language model 20. As an example, a particular program instruction to be executed upon the register transfer language model 20 representation of a microprocessor may be issued from the stimulation signal data 22 to the register transfer language model 20 and then the power behaviour associated with the execution of that instruction observed by the power modelling tool 24. The power model tool 24 will use techniques such as the dividing of the register transfer language model 20 down into smaller circuit elements of known power characteristics and the identification of signal transitions on the inputs and outputs of those circuits to break down the overall power behaviour into smaller easier to compute elements.

It will be appreciated that as many real life microprocessors are pipelined, the execution of an individual instruction will typically be performed over multiple cycles in parallel with other processing being performed under the control of other instructions and in practice the model may operate on a cycle-by-cycle basis in determining the power behaviour of the system.

As well as being applied to the register transfer language model 20, the stimulus signal data 22 is in parallel applied to a simulation model 26 which is an obscured version of the register transfer language model 20. This simulation model 26 has state variables which are a function of state variables within the register transfer language model 20. An example of such a simulation model 26 is the GASP type model produced by ARM limited.

Whilst the register transfer language model 20 and the simulation model 26 are responding in parallel to the same stimulus signal data 22, a power modelling neural network 28 receives as one training input the determined power behaviour of the register transfer language model 22 from the power modelling tool 24 and as another training input data defining the state variables of the simulation model 26 that is extracted from the simulation model. The power modelling neural network 28 will thus "learn" the relationship between state variable changes within the simulation model 26 and power behaviours to which they correspond. This learnt power behaviour data 30 is captured in order that the power modelling neural network 28 may be used in a predictive way once its training is completed.

It will be appreciated that the power modelling neural network 28 will gradually increase in accuracy as it is able to observe larger and larger amounts of calculated power behaviour in response to a variety of stimulus signal data.

Whilst a register transfer language model 20 has been discussed above, it will be appreciated that this model could take a variety of forms, such as a model which will be synthesised to provide a circuit layout, a circuit layout itself, a gate level model or various other possibilities. The simulation model 26 generally tracks the behaviour of the register transfer language model 20, but this simulation model 26 need not necessarily model the entirety of the register transfer language model 20. In particular, the modelling of debug and/or test operations within the simulation environment of the simulation model 26 may not be needed and accordingly the modelling of these elements may be omitted even though they are present within the register transfer language model 20. It will be understood that when such circuit elements are omitted, then the stimulus signals should not exercise those circuit elements as this could produce inaccurate power behaviour modelling within the self-learning power model of which the neural network 28 is one example.

Figure 4:
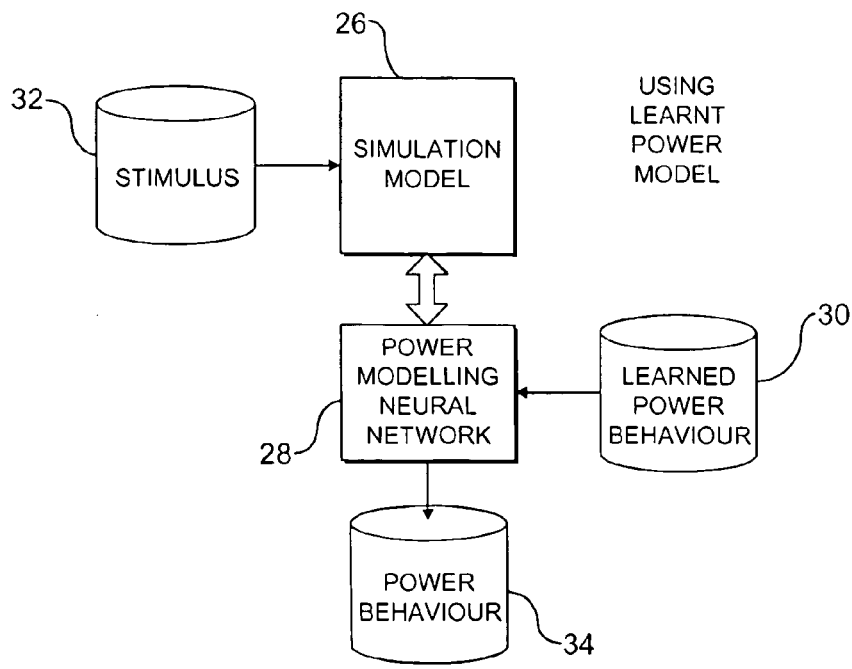
FIG. 4 schematically illustrates the use of the power model generated in FIG. 3.

FIG. 4 schematically illustrates the use of a learnt power model. In particular, once the power modelling neural network 28 has acquired sufficient learnt power behaviour 30 to be able to accurately model the power behaviour of the circuit in question, then it may be de-coupled from the register transfer language model 20 and the power modelling tool 24 which accordingly do not need to be released from the circuit designer. Thus, a user of the circuit who wishes to incorporate it within their own design may be provided with the simulation model 26 and a power model for that simulation model 26 taking the form of the power modelling neural network 28 and its associated learnt power behaviour data 30 which configures that power modelling neural network 28. The power model formed by the power modelling neural network 28 and the learnt power behaviour data 30 is responsive both to stimulus signal data 32 applied to the simulation model 26 as well as state variable data held within the simulation model 26. It will be understood that as contrasted with the prior art type of model in which circuit elements were broken down into sufficiently small portions that state was not held within those portions, the power model provided by the power modelling neural network 28 and the learnt power behaviour data 30 is responsive to both the stimulus signal data 32 and stored state within the circuit being modelled.

In operation, stimulus signal data 32 is applied to the simulation model 26 and the power model 28, 30 is used to produce power behaviour data 34 which may be analysed by the user of the system.

Figure 5:
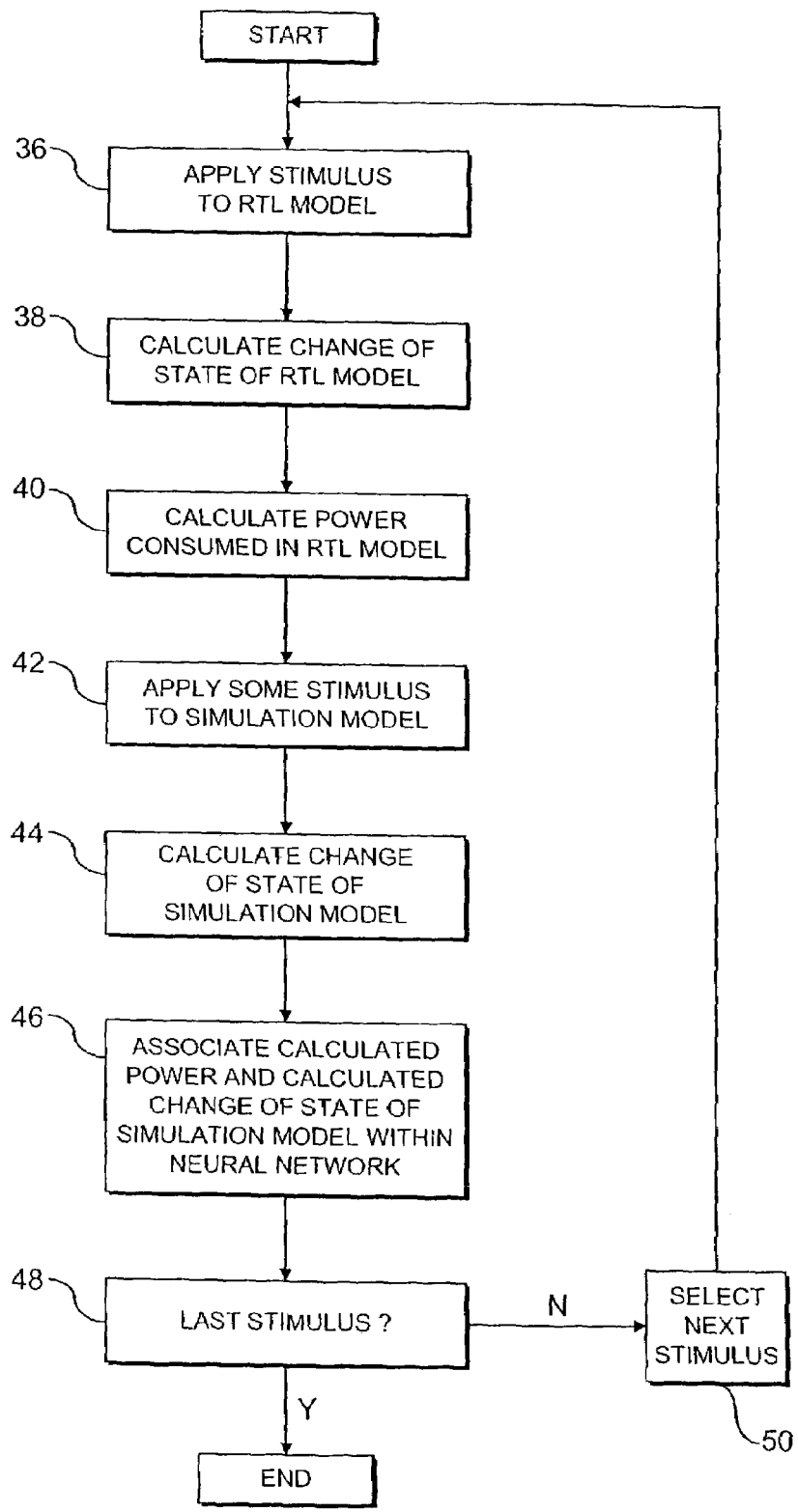
FIG. 5 is a flow diagram schematically illustrating the process of generating the power model of FIGS. 3 and 4.

FIG. 5 is a flow diagram schematically illustrating a part of the learning procedure described in relation to FIG. 3. At step 36 a stimulus is applied to the register transfer language model 20. At step 38 the register transfer language model 20 calculates it change of state associated with the applied stimulus. At step 40 the power modelling tool 24 calculates the power consumed by the circuit being modelled by the register transfer language model 20 as a consequence of the change of state calculated at step 38.

At step 42 the same stimulus which was applied to the register transfer language model 20 is applied to the simulation model 26. At step 44 the simulation model 26 calculates its change of state in response to that applied stimulus. At step 46 the calculated power and the calculated change of state of the simulation model are associated together within a neural network by being applied as training data to the neural network. The ability of neural networks to learn from training data and then reproduce the behaviour shown by that training data is well know in the field of neural networks and will not be described herein in any further detail. At step 48 a check is made as to whether or not the last stimulus has been reached within the stimulus signal data 24. If the last stimulus has not yet been reached, then the next stimulus signal is selected at step 50 and processing is returned to step 36. If the last stimulus has been reached, then the learning process terminates.

Figure 6:
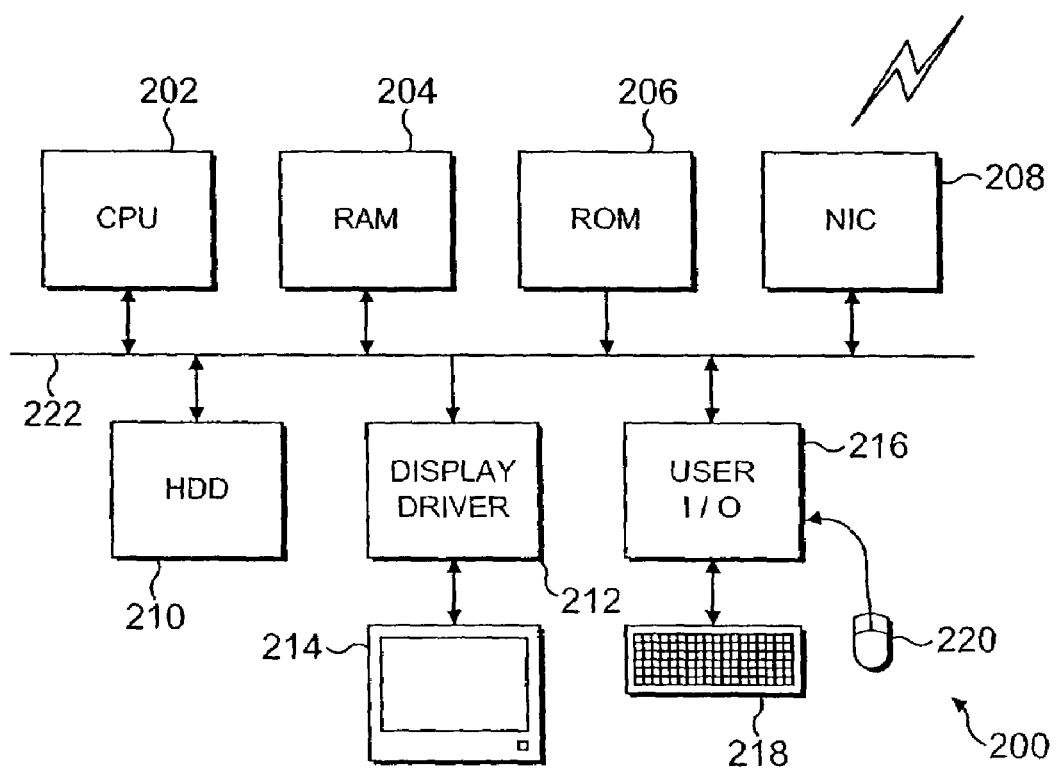
FIG. 6 is a diagram schematically illustrating the architecture of a general purpose computer which may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating a power model of a circuit, said method comprising the steps of:
   simulating said circuit responding to a set of stimulus signals using a first simulator and a first circuit model having state variables;
   determining respective power behaviour responses of said first circuit model to said set of stimulus signals;
   simulating said circuit responding to said set of stimulus signals using a second simulator and a second circuit model;
   determining respective state variable changes of said second circuit model resulting from said set of stimulus signals, said state variable changes of said second circuit model being a function of state variables of said first circuit model; and
   associating a determined power behaviour response to a stimulus signal determined with said first circuit model with a corresponding determined state variable change resulting from said stimulus signal to form a power model for said second circuit model whereby state variable changes of said second circuit model may be mapped to corresponding power behaviour responses.

2. A method as claimed in claim 1, wherein said power model is a self-learning model.

3. A method as claimed in claim 2, wherein said power model is a neural network and said step of associating includes applying power behaviour responses and corresponding state variable changes as training data to said neural network.

4. A method as claimed in claim 1, wherein said first circuit model is an obscured circuit model and said second circuit model is a non-obscured circuit model.

5. A method as claimed in claim 1, wherein said first circuit model is one of:
   a model which may be synthesised to form a circuit layout; and
   a model of a circuit layout.

6. A method as claimed in claim 5, wherein said first circuit model is one of:
   a register transfer language circuit model; and
   a gate level circuit model.

7. A method as claimed in claim 1, wherein second circuit model is one or more of:
   a cycle-based model;
   a software development model;
   faster than said first circuit model;
   missing portions of said circuit which are modelled within said first circuit model; and
   an abstracted model of said first circuit model.

8. Apparatus for generating a power model of a circuit, said apparatus comprising a processor, which executes the following logic:
   first simulation logic operable to simulate said circuit responding to a set of stimulus signals using a first circuit model having state variables;
   first determining logic operable to determine respective power behaviour responses of said first circuit model to said set of stimulus signals;
   second simulating logic operable to simulate said circuit responding to said set of stimulus signals using a second circuit model;
   second determining logic operable to determine respective state variable changes of said second circuit model resulting from said set of stimulus signals, said state variable changes of said second circuit model being a function of state variables of said first circuit model; and
   associating logic operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

9. Apparatus as claimed in claim 8, wherein said power model is a self-learning model.

10. Apparatus as claimed in claim 9, wherein said power model is a neural network and said associating logic is operable to apply power behaviour responses and corresponding state variable changes as training data to said neural network.

11. Apparatus as claimed in claim 8, wherein said first circuit model is an obscured circuit model and said second circuit model is a non-obscured circuit model.

12. Apparatus as claimed in claim 8, wherein said first circuit model is one of:
   a model which may be synthesised to form a circuit layout; and
   a model of a circuit layout.

13. Apparatus as claimed in claim 12, wherein said first circuit model is one of:
   a register transfer language circuit model; and
   a gate level circuit model.

14. Apparatus as claimed in claim 8, wherein second circuit model is one or more of:
   a cycle-based model;
   a software development model;
   faster than said first circuit model;
   missing portions of said circuit which are modelled within said first circuit model; and
   an abstracted model of said first circuit model.

15. A computer program product comprising a computer readable storage medium containing computer readable instructions operable to control a computer to generate a power model of a circuit, said computer program product comprising:
   first simulation code operable to simulate said circuit responding to a set of stimulus signals using a first circuit model having state variables;
   first determining code operable to determine respective power behaviour responses of said first circuit model to said set of stimulus signals;
   second simulating code operable to simulate said circuit responding to said set of stimulus signals using a second circuit model;
   second determining code operable to determine respective state variable changes of said second circuit model resulting from said set of stimulus signals, said state variable changes of said second circuit model being a function of state variables of said first circuit model; and
   associating code operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

16. A computer program product as claimed in claim 15, wherein said power model is a self-learning model.

17. A computer program product as claimed in claim 16, wherein said power model is a neural network and said associating code is operable to apply power behaviour responses and corresponding state variable changes as training data to said neural network.

18. A computer program product as claimed in claim 15, wherein said first circuit model is an obscured circuit model and said second circuit model is a non-obscured circuit model.

19. A computer program product as claimed in claim 15, wherein said first circuit model is one of:
   a model which may be synthesised to form a circuit layout; and
   a model of a circuit layout.

20. A computer program product as claimed in claim 19, wherein said first circuit model is one of:
   a register transfer language circuit model; and
   a gate level circuit model.

21. A computer program product as claimed in claim 15, wherein second circuit model is one or more of:
   a cycle-based model;
   a software development model;
   faster than said first circuit model;
   missing portions of said circuit which are modelled within said first circuit model; and
   an abstracted model of said first circuit model.

22. A method of generating a power model of a circuit, said method comprising the steps of:
   simulating said circuit responding to a set of stimulus signals using a first stimulator and a first circuit model having state variables;
   determining respective power behaviour responses of said first circuit model to said set of stimulus signals;
   simulating said circuit responding to said set of stimulus signals using a second simulator and a second circuit model, wherein second circuit model is
      faster than said first circuit model and
      an abstracted model of said first circuit model;
   determining respective state variable changes of said second circuit model resulting from said set of stimulus signals, said state variable changes of said second circuit model being a function of state variables of said first circuit model; and
   associating a determined power behaviour response to a stimulus signal with a corresponding determined state variable change resulting from said stimulus signal to form a power model for said second circuit model whereby state variable changes of said second circuit model may be mapped to corresponding power behaviour responses.

23. Apparatus for generating a power model of a circuit, said apparatus comprising a processor, which executes the following logic:
   first simulation logic operable to simulate said circuit responding to a set of stimulus signals using a first circuit model having state variables;
   first determining logic operable to determine respective power behaviour responses of said first circuit model to said set of stimulus signals;
   second simulating logic operable to simulate said circuit responding to said set of stimulus signals using a second circuit model, wherein said second circuit model is
      faster than said first circuit model and
      an abstracted model of said first circuit model;
   second determining logic operable to determine respective state variable changes of said second circuit model resulting from said set of stimulus signals, said state variable changes of said second circuit model being a function of state variables of said first circuit model; and
   associating logic operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

24. A computer program product comprising a computer readable storage medium containing computer readable instructions operable to control a computer to generate a power model of a circuit, said computer program product comprising:
- first simulation code operable to simulate said circuit responding to a set of stimulus signals using a first circuit model having state variables;
- first determining code operable to determine respective power behaviour responses of said first circuit model to said set of stimulus signals;
- second simulating code operable to simulate said circuit responding to said set of stimulus signals using a second circuit model, wherein second circuit model is faster tan said first circuit model and an abstracted model of said first circuit model;
- second determining code operable to determine respective state variable changes of said second circuit model resulting from said set of stimulus signals, said state variable changes of said second circuit model being a function of state variables of said first circuit model; and
- associating code operable to associate a determined power behaviour response to a stimulus signal with a corresponding determined state variable change resulting from said stimulus signal to form a power model for said second circuit model whereby state variable changes of said second circuit model may be mapped to corresponding power behaviour responses.

* * * * *